June 11, 1946.　　　A. R. MUDICA　　　2,402,070
CURVED SURFACE GENERATING DEVICE
Filed March 20, 1944
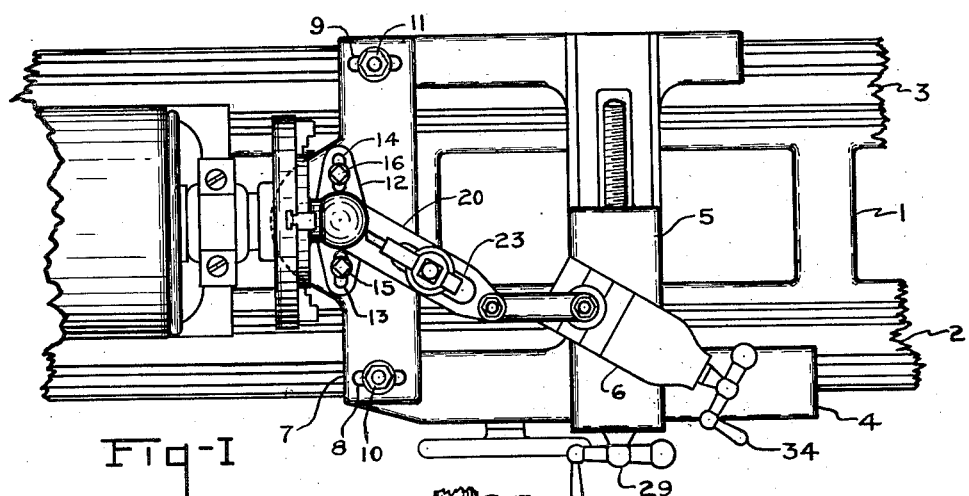
Fig-1
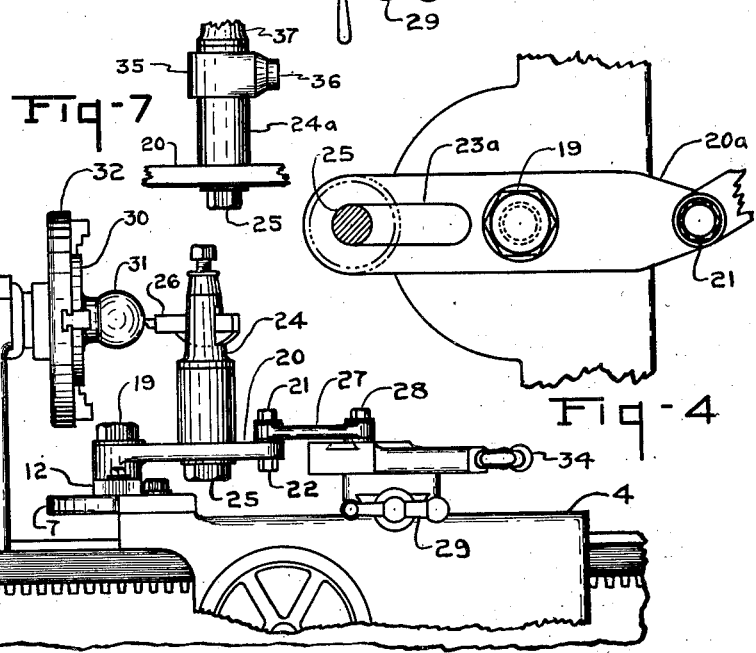
Fig-7
Fig-4
Fig-2
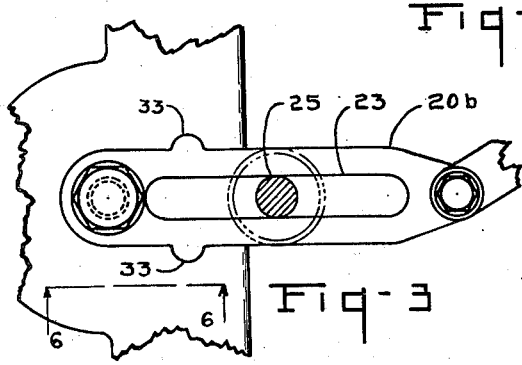
Fig-3
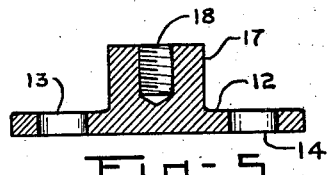
Fig-5
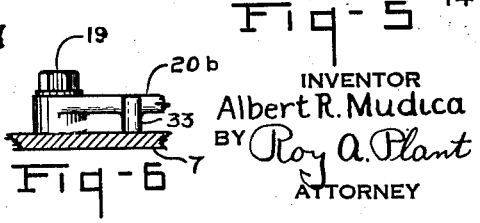
Fig-6
INVENTOR
Albert R. Mudica
BY Roy A. Plant
ATTORNEY Patented June 11, 1946

2,402,070

UNITED STATES PATENT OFFICE 2,402,070

CURVED SURFACE GENERATING DEVICE

Albert R. Mudica, Marshall, Mich.

Application March 20, 1944, Serial No. 527,297

9 Claims. (Cl. 82—12)

The present invention relates broadly to forming apparatus, and in its specific phases to a lathe attachment for machining both concave and convex surfaces.

The machining of concave and convex surfaces in the past has called for the use of an extremely complex apparatus, which in some cases may involve the use of cams, and in others the use of special geared drives. Form cutters have also been used for this purpose in spite of the difficulties incident to maintaining proper contours. Rough hand work in forming these surfaces has also been resorted to in a great many cases, although this is not too satisfactory and moreover is inherently subject to inaccuracy and errors by the operator. The shortcomings of the prior art, as well as the need of a simple apparatus for machining concave and convex surfaces, led to the discovery and development of the present invention.

Accordingly among the objects of the present invention is the provision of a relatively simple attachment for a lathe or the like, wherein the concave or convex surface is automatically produced by the operation of the lathe alone after the apparatus has been adjusted. This eliminates the possibility of errors which are inherent with strictly hand operated devices.

Another object is to provide a mechanism for cutting concave and convex surfaces by attachment to a standard lathe so as to be operated through the compound rest and regulation cross feed drive mechanism.

A further object of the invention is to provide a support and linkage construction for carrying and moving a cutting tool in manner such that by either manual or power operation the cutting tool is caused to be automatically guided so that its cutting edge will describe the arc of a perfect circle.

A still further object of the present invention is to provide an improved lathe attachment in which the cutting tool may be readily adjusted so as to move in various sizes of arcs for generating either concave or convex surfaces.

Still further objects and advantages of the present invention will appear as the description proceeds.

To the accomplishment of the foregoing and related ends, the invention, then, consists of the means hereinafter fully described and particularly pointed out in the claims, the annexed drawing and the following description setting forth in detail certain means for carrying out the invention, such disclosed means illustrating, however, but several of various ways in which the principle of the invention may be used.

In said annexed drawing:

Figure 1 diagrammatically illustrates a fragmentary plan view of a lathe having a preferred form of the present invention attached thereto.

Figure 2 illustrates a side view of the apparatus shown in Figure 1.

Figure 3 illustrates in enlarged top view a fragmentary portion of a modified form of the linkage and support shown in Figures 1 and 2.

Figure 4 illustrates in enlarged top view a fragmentary portion of another modified form of the linkage of the present invention.

Figure 5 illustrates an enlarged center longitudinal section of a preferred form of pivot carrying member for use in the apparatus of the present invention.

Figure 6 illustrates a reduced size, fragmentary side view of the linkage and support shown in Figure 3, all as taken along line 6—6 looking in the direction of the arrows.

Figure 7 illustrates the use of an adjustable tool post as part of the present invention.

Referring more particularly to the drawing, the apparatus of the present invention is shown as attached to a lathe I having front and back side rails 2 and 3. Carriage 4 with cross feed 5, and compound rest 6, is connected to lathe I for operation in the usual manner. Mounted on carriage 4 is a cross support 7 which is provided with slots 8 and 9, Figure 1, adjacent its ends for the reception of studs 10 and 11 which permit adjustment of the cross support relative to the carriage in a direction lengthwise of the lathe. Mounted on cross support 7 is a pivot carrying member 12, Figures 1 and 5, which is preferably provided with slots 13 and 14 which, in combination with studs 15 and 16, permit adjustment of pivot carrying member 12 crosswise of the lathe.

A preferred form of pivot carrying member 12 is shown in section in Figure 5 with a pivot member 17 extending upwardly and provided with an internally threaded portion 18. This type of construction permits accurate machining of the pivot carrying member 12 to very close tolerances while maintaining the maximum amount of rigidity. The invention, however, is not limited to a pivot carrying member of the specific construction shown in Figure 5, since pivot member 17 may be omitted entirely and in its place a threaded opening may be made in the base portion of pivot carrying member 12 to receive a suitable pivot stud which, in preferred construction, would be in the form of a shoulder screw machined to close tolerances. The showing in Figure 2 is to be considered as diagrammatically illustrating either of these constructions or the equivalent thereof, wherein stud 19 either fits threaded opening 18 in pivot member 17 or a threaded opening in the base portion of pivot carrying member 12 when pivot member 17 has been omitted.

Mounted on pivot member 17 is an arm 20, Figures 1 and 2. This arm is conventionally provided with an opening of suitable size and close tolerance for the reception of pivot member 17 at one end, and a shoulder screw 21 with locking nut 22 at the other end. The opening in the end of arm 20 for receiving shoulder screw 21 is preferably threaded so that the shoulder screw may be turned down to desired position and then locked in that position by means of locking nut 22. Arm 20 is provided with a lengthwise slot 23 on which is mounted a tool post 24 which may be adjustably clamped in place in conventional manner, for instance by means of a suitable stud 25. This type of construction facilitates adjustment of the tool post 24 to meet varying requirements. This tool post in turn will carry a cutting tool 26 mounted for adjustment in conventional manner. This cutting tool may be in the form of a simple cutter, a grinding wheel device, or other cutting device, and it is to be understood that the drawing is intended to diagrammatically illustrate same.

Link 27, preferably having suitable parallel cylindrical openings in its ends, is used for joining arm 20, through shoulder screw 21, to compound rest 6 by means of a suitable shoulder screw 28. The apparatus is thus adjustable to different positions and, when mounted as described, the point of cutting tool 26 will swing in an arc about the vertical center line of pivot member 17 when cross feed member 5 is moved cross-wise of carriage 4, either by hand operation of crank 29, or by power drive in conventional manner.

For stability of arm 20b it may be provided with supporting legs 33 as shown in Figures 3 and 6. The lower end of each of these legs, which may be either fixed or adjustable, preferably rests on the top of cross support 7 and moves in an arcuate path about pivot member 17 in step with movement of arm 20b.

The operation of the apparatus, as shown in Figures 1 and 2, and which is particularly adapted for cutting convex radii, is as follows: A work piece 30, on which it may be desired to machine a partial spherical end 31, is suitably mounted in chuck 32 for rotation in conventional manner. The cutting point of cutting tool 26 is preferably adjusted so as to be level with a horizontal plane through the center line of the spherical end 31 of the rotatably held work piece to be machined. At the same time the vertical center line of the pivot member 17 is adjusted so as to substantially include, during the final cut, the center of the partial sphere to be machined. Usually several cuts will be required before the spherical end is down to size and, accordingly, the cutting tool is adjusted so as to meet this condition. While the illustration of the apparatus in Figures 1 and 2 show the forming of a partial spherical end on a work piece, the invention is not limited to apparatus only adapted for that type of work, but rather other forms of convex radii can be turned with the same apparatus. For instance, the apparatus can be used for cutting semi-circular ring-like portions on bars or the like.

The apparatus is also adapted for cutting concavities of prescribed radii. This can be accomplished for instance by means of the use of an arm 20a, as shown in Figure 4 in the place of arm 20b as shown in Figure 3. In this case the slot 23a, instead of being between stud 19 and shoulder screw 21, is at the left of stud 19. Stud 25 in this case would be joined to tool post 24, as previously described, but with the carriage 4 moved to the right and the cutting tool pointed to the left, the same as is diagrammatically shown in Figure 2 with the other style of arm. The swinging of arm 20a about stud 19 on pivot member 17 will cause the cutting tool 26 to move in an arc which, under normal operating conditions, will cut a concavity in the end of the work piece 30 instead of forming a partial sphere 31.

For ease of adjustment of the assembly to cut various radii to very close tolerances, a suitable adjustment means may be provided. Referring to Figure 7, tool post 24a may have an inbuilt adjustment mechanism 35 operated by graduated micrometer knob 36. The rotation of this knob in turn will move the cutting tool and its carrier 37 forward or back, within limits of operation of the device, depending upon the direction of rotation of the knob. It is to be understood that the showing in this figure is merely for the purpose of diagrammatically illustrating the various equivalent types of apparatus which may be used to readily adjust the cutting tool and to and from the work piece and is not to be taken as a limitation of the invention.

The present invention thus provides a very simple attachment for lathes or the like, which permits ready adjustment for the machining of a work piece, within the limits of the apparatus, to the form of either a concave or a convex surface of prescribed machining radius.

Other modes of applying the principle of my invention may be employed instead of those explained, change being made as regards the mechanism therein disclosed, provided the means stated by any of the following claims or the equivalent of such stated means be employed.

I therefore particularly point out and distinctly claim as my invention:

1. A curved surface generating device comprising means for rotatably holding a work piece on which a curved surface is to be generated, a support member, a pivot member on said support member, the axis of said pivot member including the center about which said curved surface is to be generated, an arm pivotally mounted on said pivot member for rotary movement about the axis thereof, a cutting means, a support for said cutting means mounted on said arm and adjustable length-wise thereof, said cutting means being adapted for generating said curved surface on said work piece during rotation of the latter, a link, a feeding means, means for pivotally joining one end of said link to one end of said arm, and means for pivotally joining the other end of said link to said feeding means, whereby operation of said feeding means will act through said link to pivotally move said arm, and cutting means mounted thereon, about the axis of said pivot member.

2. A curved surface generating device comprising means for rotatably holding a work piece on which a curved surface is to be generated, a support member, a carrier for said support member, means for adjusting said support member on said carrier member, a pivot member on said support member, the axis of said pivot member including the center about which said curved surface is to be generated, an arm pivotally mounted on said pivot member for rotary movement about the axis thereof, a cutting means, a support for said cutting means mounted on said arm and adjustable length-wise thereof, said cutting means being adapted for generating said curved surface on said work piece during rotation of the latter, a link, a feeding means, means for pivotally joining one end of said link to one end of said arm, and means for pivotally joining the other end of said link to said feeding means, whereby operation of said feeding means will act through said link to pivotally move said arm, and cutting means mounted thereon, about the axis of said pivot member.

3. A curved surface generating device comprising means for rotatably holding a work piece on which a curved surface is to be generated, a support member, a carrier for said support member, means for adjusting said support member on said carrier member, a pivot member on said support member, means for adjusting said pivot member on said support member, the axis of said pivot member including the center about which said curved surface is to be generated, an arm pivotally mounted on said pivot member for rotary movement about the axis thereof, a cutting means, a support for said cutting means mounted on said arm and adjustable length-wise thereof, said cutting means being adapted for generating said curved surface on said work piece during rotation of the latter, a link, a feeding means, means for pivotally joining one end of said link to one end of said arm, and means for pivotally joining the other end of said link to said feeding means, whereby operation of said feeding means will act through said link to pivotally move said arm, and cutting means mounted thereon, about the axis of said pivot member.

4. The combination with a lathe having a work piece holding means as well as a carriage with cross feed and compound rest, of a cross support mounted on said carriage, means for anchoring said cross support on said carriage while permitting adjustment of same on said carriage in a direction lengthwise of said lathe, a pivot carrying means mounted on the upper face of said cross support, means for anchoring said pivot carrying means on said cross support while permitting adjustment of same on said cross support crosswise of said lathe, an arm member pivotally mounted on said pivot carrying means, a link means for pivotally joining said arm to said compound rest, a cutting means, a support for said cutting means, and means for mounting said cutting means support on said arm for endwise adjustment thereon.

5. The combination with a lathe having a work piece holding means as well as a carriage with cross feed and compound rest, of a cross support mounted on said carriage, means for anchoring said cross support on said carriage while permitting adjustment of same on said carriage in a direction lengthwise of said lathe, a pivot carrying means mounted on the upper face of said cross support, means for anchoring said pivot carrying means on said cross support while permitting adjustment of same on said cross support crosswise of said lathe, an arm member pivotally mounted on said pivot carrying means, a link means for pivotally joining said arm to said compound rest, a cutting tool supporting means, means for adjustably anchoring said cutting tool supporting means on said arm for limited movement length-wise thereof, and a cutting tool suitably joined to said adjustable location cutting tool supporting means.

6. The combination with a lathe having a work piece holding means as well as a carriage with cross feed and compound rest, of a cross support mounted on said carriage, means for anchoring said cross support on said carriage while permitting adjustment of same on said carriage in a direction lengthwise of said lathe, a pivot carrying means mounted on the upper face of said cross support, means for anchoring said pivot carrying means on said cross support while permitting adjustment of same on said cross support crosswise of said lathe, an arm member pivotally mounted on said pivot carrying means, a link means for pivotally joining said arm to said compound rest, means for supporting said arm between the ends thereof and at the same side of said pivot member as that on which said cutting tool is mounted, a cutting tool supporting means, means for adjustably anchoring said cutting tool supporting means on said arm for limited movement length-wise thereof between its pivoted ends, and a cutting tool suitably joined to said cutting tool supporting means.

7. The combination with a lathe having a work piece holding means as well as a carriage with cross feed and compound rest, of a cross support mounted on said carriage, means for anchoring said cross support on said carriage while permitting adjustment of same on said carriage in a direction lengthwise of said lathe, a pivot carrying means mounted on the upper face of said cross support, means for anchoring said pivot carrying means on said cross support while permitting adjustment of same on said cross support crosswise of said lathe, a projecting end arm member pivotally mounted between its ends on said pivot carrying means, a link means for pivotally joining said arm to said compound rest, a cutting tool supporting means, means for adjustably anchoring said cutting tool supporting means on the projecting end portion of said arm for controlled movement lengthwise thereof, and a cutting tool suitably joined to said cutting tool supporting means.

8. The combination with a lathe having a work piece holding means as well as a carriage with cross feed and compound rest, of a cross support mounted on said carriage, means for anchoring said cross support on said carriage while permitting adjustment of same on said carriage in a direction lengthwise of said lathe, a pivot carrying means mounted on the upper face of said cross support, means for anchoring said pivot carrying means on said cross support while permitting adjustment of same on said cross support crosswise of said lathe, an arm member pivotally mounted on said pivot carrying means, said arm member having a substantially longitudinal slot therein, a link, means for pivotally joining one end of said link to said arm member, means for pivotally joining the other end of said link to said compound rest, a cutting tool, a cutting tool supporting means adjustably joined to said arm through said substantially longitudinal slot therein for controlled movement length-wise thereof, and means for suitably adjusting said cutting tool on said cutting tool supporting means.

9. A curved surface generating device comprising means for rotatably holding a work piece on which a curved surface is to be generated, a support member, a pivot member on said support member, the axis of said pivot member including the center about which said curved surface is to be generated, an arm pivotally mounted on said pivot member for rotary movement about the axis thereof, a cutting means, a support for said cutting means mounted on said arm and adjustable length-wise thereof, said cutting means being adapted for generating said curved surface on said work piece during rotation of the latter, a micrometer type mechanism for adjusting the cutting means, within limits, to and from said work piece, a link, a feeding means, means for pivotally joining one end of said link to one end of said arm, and means for pivotally joining the other end of said link to said feeding means, whereby operation of said feeding means will act through said link to pivotally move said arm, and cutting means mounted thereon, about the axis of said pivot member.

ALBERT R. MUDICA.